Dec. 15, 1925 Re. 16,226

C. H. STRUPE

TYMPANO

Original Filed March 16, 1922 3 Sheets-Sheet 1

INVENTOR.
Cecil H. Strupe,
BY
Hood & Hahn,
ATTORNEYS

Dec. 15, 1925. Re. 16,226

C. H. STRUPE

TYMPANO

Original Filed March 16, 1922 3 Sheets-Sheet 2

INVENTOR.
Cecil H. Strupe,
BY
Hood + Hahn.
ATTORNEYS

Dec. 15, 1925 Re. 16,226
C. H. STRUPE
TYMPANO
Original Filed March 16, 1922 3 Sheets-Sheet 3
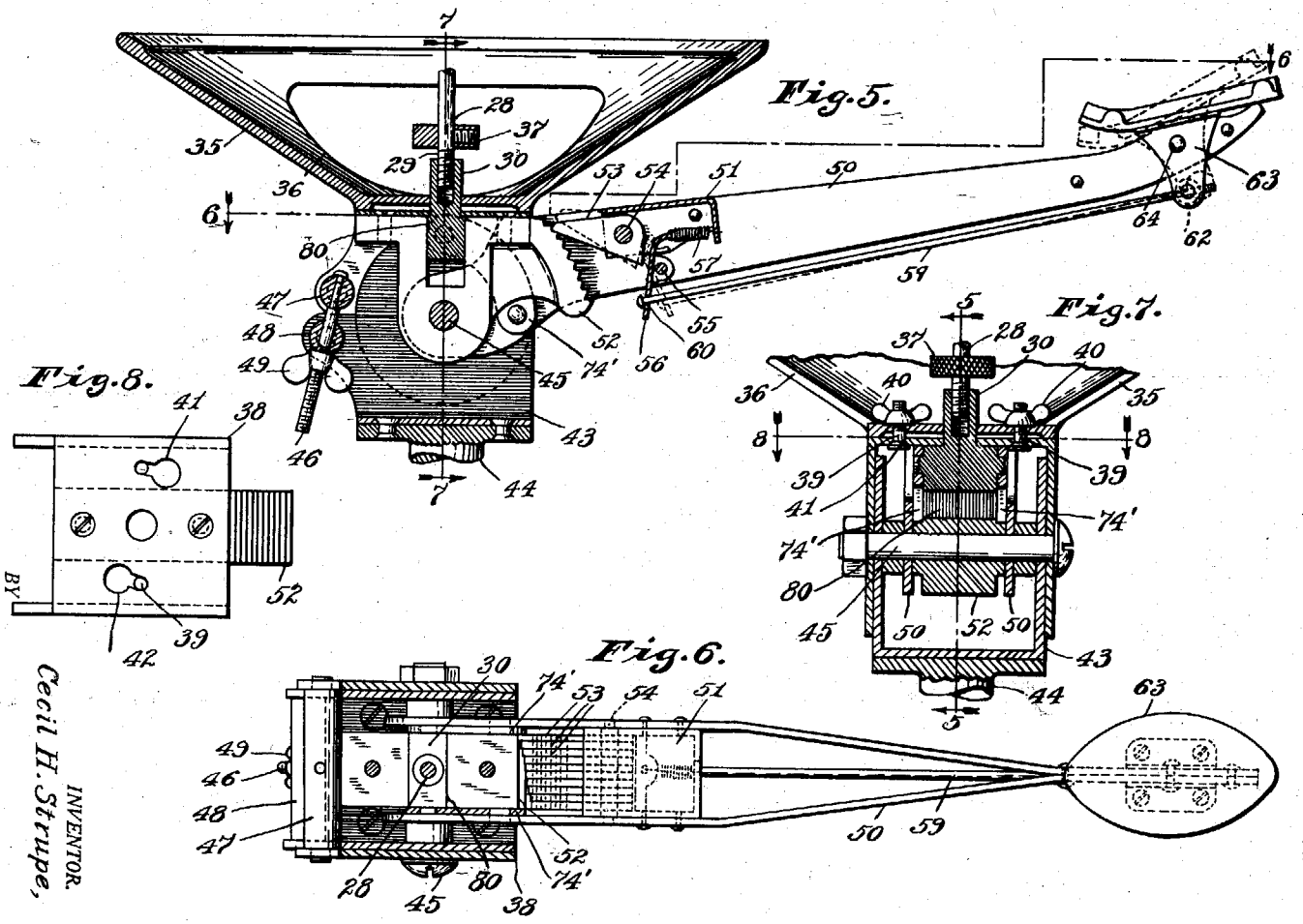
INVENTOR.
Cecil H. Strupe,
BY
Hood + Hahn,
ATTORNEYS Reissued Dec. 15, 1925.

Re. 16,226

UNITED STATES PATENT OFFICE.

CECIL H. STRUPE, OF INDIANAPOLIS, INDIANA, ASSIGNOR TO LEEDY MANUFACTURING COMPANY, OF INDIANAPOLIS, INDIANA, A CORPORATION OF INDIANA.

TYMPANO.

Original No. 1,469,197, dated September 25, 1923, Serial No. 544,169, filed March 6, 1922. Application for reissue filed June 27, 1924. Serial No. 722,875.

*To all whom it may concern:*

Be it known that I, CECIL H. STRUPE, a citizen of the United States, residing at Indianapolis, in the county of Marion and State of Indiana, have invented new and useful Tympanos, of which the following is a specification.

The object of my invention is to produce a tympano which can be readily and accurately varied in pitch, the construction being such that it may be readily disassembled for transportation without dismemberment of the primary hand controlled tuning members from the head ring, thereby retaining the primary operative condition of the head upon the kettle.

Figure 1:
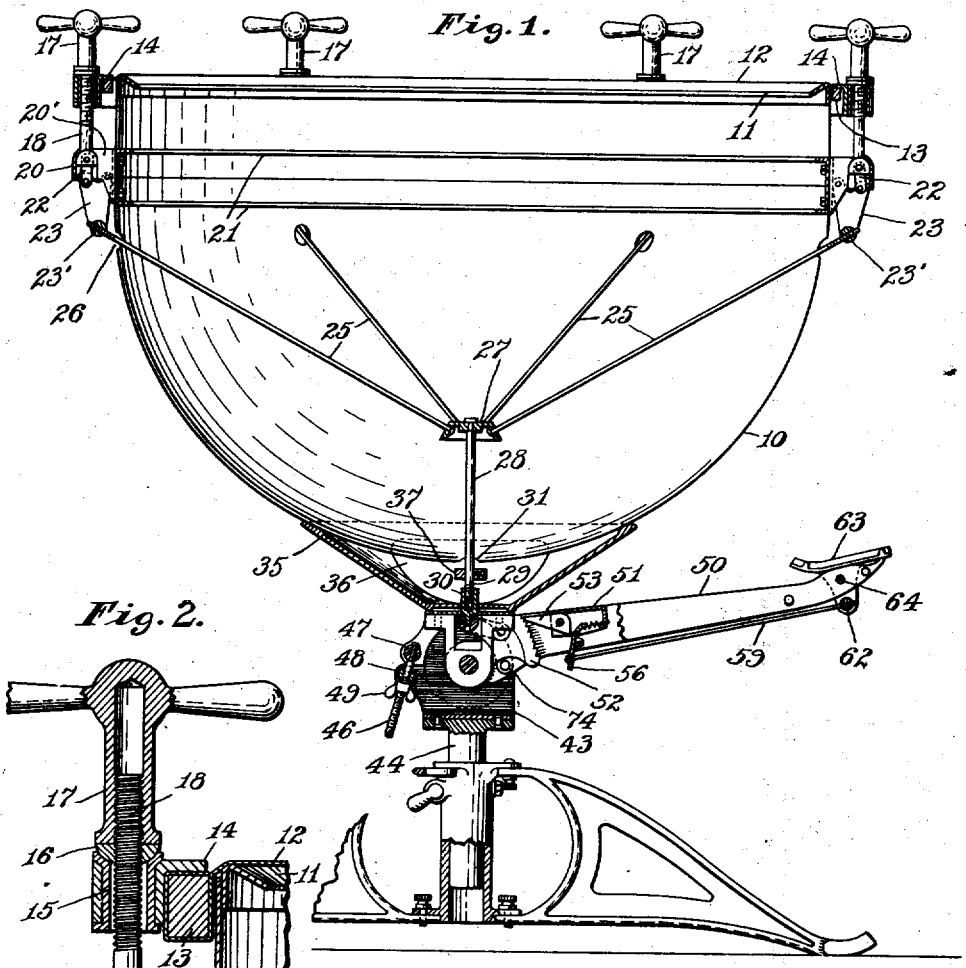
Figure 2:
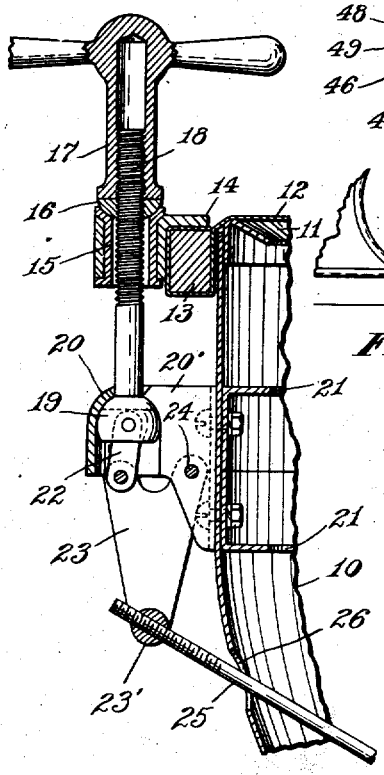
Figure 3:
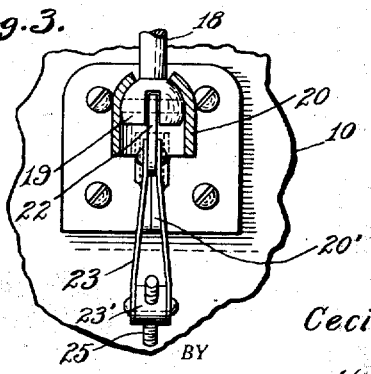
Figure 4:
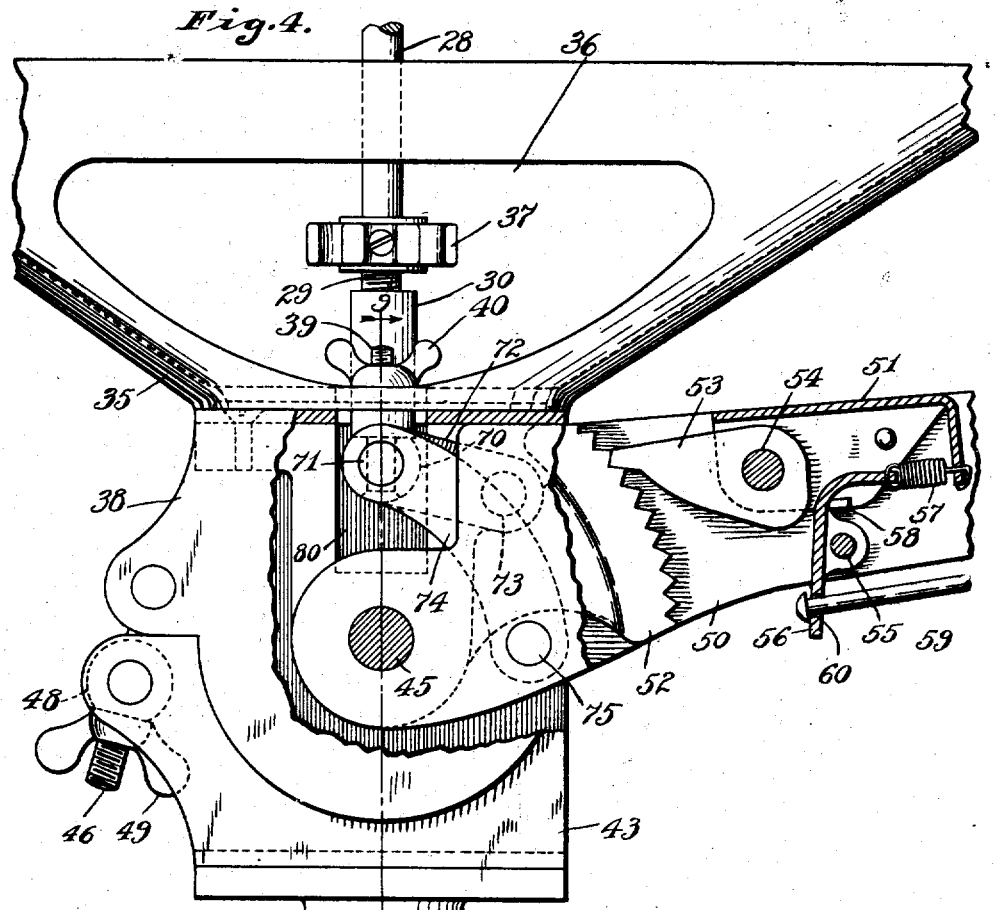
Figure 9:
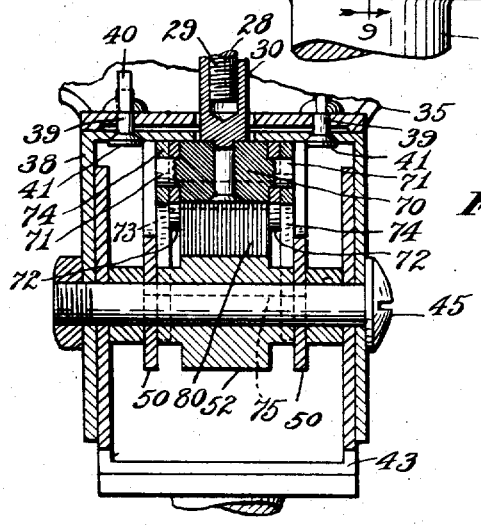

The accompanying drawings illustrate my invention: Fig. 1 is a vertical section of ar apparatus embodying my invention; Fig. 2 a fragmentary sectional detail, on a scale somewhat larger than that of Fig. 1, of one of the tuning units; Fig. 3, a fragmentary detail, in partial vertical section on a plane at right angles to the plane of Fig. 2, of parts of one of tuning elements; Fig. 4 an elevation in partial vertical section of the connection between the foot pedal and main pull rod; Fig. 5, a detail in partial vertical section of a modification of the connection between the foot pedal and main pull rod; Fig. 6 a section on line 6—6 of Fig. 5, this being equally illustrative of the same parts shown in Fig. 1; Fig. 7 a section on line 7—7 of Fig. 5; Fig. 8 a plan on line 8—8 of Fig. 7 and Fig. 9 a section on line 9—9 of Fig. 4.

In the drawings, 10 indicates the kettle, of ordinary form, provided at its upper end with the usual ring 11 upon which the vibrating head 12 is supported.

The head 12 is provided with the usual flesh ring 13 which, in turn, is engaged by the horizontal flange of the usual pressure ring 14, said pressure ring being provided at suitable circumferentially spaced points with eyes 15 which, at their upper ends, form a support for the pressure washer 16 engaged by the adjusting nut 17 on the tuning pin 18, the threaded shank of which is projected upwardly through the eye 15 and washer 16 into nut 17. The lower end of the tuning pin 18 is provided with a spherical head 19 which seats in a semispherical socket 20 secured to the shell of the kettle 10, suitable internal bracing rings 21 being provided to afford adequate support for the brackets.

Up to this point the construction is well known.

The socket 20 is so formed that head 19 may be freely moved downwardly away from its seat in the socket 20 and, in the present construction, this movement is accomplished by means of a link 22 and bell crank 23, the bell crank being conveniently formed of a pair of sheet metal stampings as clearly shown in Fig. 3, pivoted at 24 to the bracket 20′ in which socket 20 is formed.

Between the elements which form bell crank 23, I pivot a cross bar block 23′ having a diametrical threaded perforation into which is threaded the outer end of a pull rod 25.

The several pull rods 25 are projected inwardly, through suitable perforations 26 in kettle 10, and their inner ends are joined by a central head 27 which is journaled upon the upper end of the primary pull rod 28, which, at its lower end, is threaded, at 29, into a block 30, the primary pull rod being projected through a perforation 31 in the bottom of the kettle.

The kettle 10 seats in a conical cup 35, the wall of which is preforated at diametrically opposite points, as indicated at 36, so that the operator may readily reach a collar 37, secured to the pull rod 28, in order that said pull rod may be screwed into or out of the block 30.

Cup 35 is preferably detachably connected to a supporting fitting 38, (Fig. 7) by means of clamping screws 39 which are carried by the cup 35. Screws 39 are provided on their upper ends with finger nuts 40 and on their lower ends with heads 41 which may be projected through keyhole slots 42 (Fig. 8) whereby the cup may be readily clamped to or removed from the fitting 38.

Fitting 38 is pivotally connected to the head 43 of the pedestal spindle 44 by a bolt 45 and is held in any desired position of angular adjustment around said bolt 45 by means of an adjusting screw 46 which is journaled in a diametrical passage formed through a block 47 pivoted between the side plates of fitting 38, and is projected through a diametrical perforation in a cross bar 48 pivoted between the side plates of head 43 and forming an abutment for the finger nut 49 on the threaded portion of rod 46, the arrangement being such that the kettle may be readily tilted by swinging the fitting 38 on bolt 45.

Pivoted upon bolt 45 is a foot lever 50 preferably formed of a pair of mating sheet metal stampings and an intermediate cross head 51.

Between the straddled legs of lever 50 is a ratchet segment 52 secured to the fitting 38 as shown in Fig. 5, and adapted to be engaged by a plurality of pawls 53 pivoted on the cross rod 54 of the pedal lever 50, said pawls being of varying lengths with a variation substantially equal to one step of ratchet 52, so that lever 50 may be held in minutely variable positions. Pivoted at 55, adjacent the heels of pawls 53 is a plate 56 normally held in the position shown in Fig. 4 by spring 57 against the stop 58, but so proportioned that, by a pull exerted on rod 59, the plate may be brought into engagement with the pawls 53 in order to lift them from engagement with ratchet 52. The pull rod 59 is projected through a perforation 60 in plate 56 so as to be readily rotatable and its opposite end is threaded and projected through a diametrical threaded perforation in a block 62 (dotted lines Fig. 5) pivotally supported in a treadle or foot piece 63 pivoted at 64 upon the outer end of lever 50, the arrangement being such that a nice adjustment of the parts may be obtained so that a comparatively small swing of the foot piece 63 upon lever 50 will serve to retract the pawls 53 from the teeth of ratchet 52.

Up to this point, the construction shown in detail in Figures 4 and 5 are identical. It will be readily understood that the precise connection between block 30 and lever 50 may be varied to a considerable extent without departing from the spirit of my invention as thus far disclosed, and that such variations may in themselves possess distinguishing characteristics.

It is, of course, desirable that, as the pitch of the instrument is increased by greater tensioning of the head 12, the resistance offered by said head to movement of the foot lever be as nearly uniform as possible, as such a condition facilitates the accurate tuning of the instrument. For this reason, I prefer the form of connection shown in Fig. 4, where the lower end of block 30 carries a trunnion head 70 provided at its ends with trunnions 71 journaled in the outer ends of a pair of links 72, pivoted at 73 to segment 52, said trunnions 71, also serving as the pivotal connection with the upper ends of a pair of links 74, pivoted at 75 to foot lever 50. In the initial position, i. e., with the foot lever 50 at its highest point and the head 12, therefore, in such condition as to give the lowest pitch sound, the links 74 lie at a very acute angle to links 72 but, as lever 50 is depressed, the angle between the links 72 and 74 gradually increases, thus causing the force applied to links 74 to act with a gradually increasing leverage upon links 72 and consequently to act with a gradually increasing leverage upon block 30 and the primary pull rod 28 and thereby compensating the gradually increasing resistance of head 12.

Referring now to Figures 5 and 7, it will be noted that links 72 are omitted; that links 74′ (corresponding to links 74 in the other form) are directly pivotally connected with head 30 and that head 30 is slidably mounted in a guide way 80 in segment 52. In this construction links 74′ approach the line of movement of block 30 in guide 80 as the foot lever is depressed and there is some slight increase in leverage, as a consequence, but, owing to the particular limitations in proportion which are involved from structural necessities, this increase in leverage is not quite so great as it is in the other form.

It will be noted that, by unscrewing the rod 28 from block 30, the kettle 10 may be lifted from cup 35 but that the initial tuning of the instrument will not be modified because the tuning pins will have their heads 19 remain seated in the sockets 20. It will also be noted, that in reseating the kettle 10 in cup 35 and forming the connection by screwing the rod 28 into block 30, the kettle may be seated in the cup with a very substantial pressure because, until the tension set up in rod 28 is equal to the tension of the initial tuning set up in the tuning pins, the heads 19 of the tuning pins will remain seated in sockets 20 and there will be no modification in the pitch of the instrument due to the initial tension in the head 12. It is therefore, apparent that the instrument may be readily dismembered for transportation without such separation of the parts as to cause inconvenience or require complete retuning.

It is also apparent that, because of the fixed abutments (sockets 20) which are provided for the tuning pins, the central head 27 may be placed deep down in the kettle and the pull rods 25 extended at a considerable angle down into the kettle, because the connection between the head 27 and foot pedal is not depended upon in obtaining the initial tensioning of the skin 12. When the parts are separated for transportation, rods 25 are not under tension.

I claim as my invention:

1. In a tympano, the combination with a kettle, the vibratile head and pressure ring, of a plurality of circumferentially spaced tuning members engaging said pressure ring, fixed abutments for said tuning members, a single actuating member, and a plurality of connections between said single actuating member and the plurality of tuning members whereby said tuning members may be simultaneously moved away from their abutments to vary the initial tension in the vibratile head.

2. In a tympano, the combination of a supporting pedestal, an actuating member adjustably supported upon said pedestal, a kettle separably supported on the pedestal and provided with a vibratile head, a plurality of circumferentially spaced tuning members independently engaging the head, fixed abutments carried by the kettle for co-operation with said tuning members, and means separably connecting said tuning members with the actuating member for simultaneously shifting the tuning members relative to the abutments to vary the initial tension in the vibratile head.

3. In a tympano, the combination with the kettle, vibratile head and pressure ring, of a plurality of circumferentially spaced tensional tuning pins co-operating with the pressure ring and independently manipulable relative to said pressure ring to locally affect adjacent portions of the vibratile head, a plurality of fixed abutments carried by the kettle for said tuning pins, an actuating member, means for releasably holding said actuating member in various positions of adjustment, and connections between said actuating member and the plurality of tuning pins whereby said tuning pins may be simultaneously withdrawn from their abutments to increase the tension in the vibratile head.

4. In a tympano, the combination with the kettle, vibratile head and pressure ring, of a plurality of circumferentially spaced tensional tuning pins co-operating with the pressure ring and independently manipulable relative to said pressure ring to locally affect adjacent portions of the vibratile head, a plurailty of fixed abutments carried by the kettle for said tuning pins, a plurality of bell cranks mounted upon said abutments and each connected to the adjacent tuning pin, a plurality of pull rods, one connected to each of the ball cranks, an actuating member, and a connection between said actuating member and the plurality of pull rods.

5. In a tympano, the combination with the kettle, vibratile head and pressure ring, of a plurality of circumferentially spaced tensional tuning pins co-operating with the pressure ring and independently manipulable relative to said pressure ring to locally affect adjacent portions of the vibratile head, a plurality of fixed abutments carried by the kettle for said tuning pins, an actuating member, and connections between said actuating member and the plurality of tuning pins whereby said tuning pins may be simultaneously withdrawn from their abutments to increase the tension in the vibratile head.

6. In a tympano, the combination of a kettle, its vibratile head, a plurality of circumferentially spaced independently adjustable tuning members associated with said head, a plurality of connected manipulating members connected with said tuning members to simultaneously actuate the same to vary the tension of the vibratile head, a support for the main kettle, a lever mounted on said support, means for holding said lever in various positions of adjustment, said means comprising a ratchet segment, a plurality of differential pawls co-operating with said segment, a foot piece mounted on the lever, and means connected with said foot piece for controlling the co-action between the pawls and segment, and means connecting the lever with the several tuning means comprising a primary pull rod, a link pivoted to the support and the pull rod, and a connecting link betwen the lever and pull rod.

7. In a tympano, the combination of a kettle, its vibratile head, a plurality of circumferentially spaced independently adjustable tuning members associated with said head, a plurality of connected manipulating members connected with said tuning members to simultaneously actuate the same to vary the tension of the vibratile head, a support for the main kettle, a lever mounted on said support, means for holding said lever in various positions of adjustment and means connecting the lever with the several tuning means comprising a primary pull rod, a link pivoted to the support and the pull rod, and a connecting link between the lever and pull rod.

8. A tympano comprising a kettle, a vibratile head, a pressure ring for acting upon said head, a plurality of tuning pins, a plurality of fixed supports for said tuning pins carried by the main body and co-acting with the tuning pins to form initial-positioning fixed abutments therefor while permitting longitudinal movement of the tuning pins relative thereto, means co-acting with said tuning pins and pressure rings to vary the initial effect of the pressure rings on the vibratile head, a primary pull rod projected into the interior of the main body, a plurality of supplemental pull rods connected to the primary pull rod, and projected outwardly through the main body and connected to the tuning pins through the medium of bell crank levers carried by the main body, and means for shifting the primary pull rod to various positions.

9. A tympano comprising a kettle, a vibratile head, a pressure ring for acting upon said head, a plurality of tuning pins, a plurality of supports for said tuning pins carried by the main body and co-acting with the tuning pins to form initial-positioning abutments therefor while permitting longitudinal movement of the tuning pins relative thereto, means co-acting with said tuning pins and pressure ring to vary the initial effect of the pressure ring on the vibratile head, a primary pull rod, a plurality of supplemental pull rods connected to the primary pull rod, a plurality of bell crank levers carried by the main body, and connecting said supplemental pull rods to the tuning pins, and means for shifting the primary pull rod to various positions.

10. A tympano comprising a kettle, a vibratile head, a pressure ring for acting upon said head, a plurality of tuning pins, a plurality of fixed supports for said tuning pins carried by the main body and co-acting with the tuning pins to form initial-positioning fixed abutments therefor while permitting longitudinal movement of the tuning pins relative thereto, means co-acting with said tuning pins and pressure ring to vary the initial effect of the pressure ring on the vibratile head, a primary pull rod projected into the interior of the main body, a plurality of supplemental pull rods connected to the primary pull rod, and projected outwardly through the main body and connected to the tuning pins, and means for shifting the primary pull rod to various positions.

11. A tympano comprising a kettle, a vibratile head, a pressure ring for acting upon said head, a plurality of tuning pins, a plurality of fixed supports for said tuning pins carried by the main body and co-acting with the tuning pins to form initial-positioning fixed abutments therefor while permitting longitudinal movement of the tuning pins relative thereto, means co-acting with said tuning pins and pressure ring to vary the initial effect of the pressure ring on the vibratile head, a primary pull rod, a plurality of supplemental pull rods connected to the primary pull rod, and connected to the tuning pins, and means for shifting the primary pull rod to various positions.

12. In a tympano, the combination of the kettle and its vibratile head, a pressure ring acting on said head, a plurality of tuning pins depending from the pressure ring and carrying means normally to determine the upper position of the tuning pins, means for independently varying the effective lengths of the tuning pins whereby an initial tuning of the vibratile head may be obtained, a primary pull rod, a plurality of supplementary pull rods radiating from the primary pull rod and connected to the several tuning pins so as to draw them downwardly upon exertion of sufficient force upon the primary pull rod, and an operating member separably connected to said primary pull rod.

13. In a tympano, the combination of the kettle and its vibratile head, a pressure ring acting on said head, a plurality of tuning pins depending from the pressure ring and carrying means normally to determine the upper position of the tuning pins, means for independently varying the effective lengths of the tuning pins whereby an initial tuning of the vibratile head may be obtained, a primary pull rod, a plurality of supplemental pull rods radiating from the primary pull rod and connected to the several tuning pins so as to draw them downwardly upon exertion of sufficient force upon the primary pull rod.

14. In a tympano, the combination of the kettle and its vibratile head, a pressure ring acting on said head, a plurality of tuning pins depending from the pressure ring and carrying means normally to determine the upper position of the tuning pins, means for independently varying the effective lengths of the tuning pins whereby an initial tuning of the vibratile head may be obtained, a primary pull rod, a plurality of supplemental pull rods radiating from the primary pull rod and connected to the several tuning pins so as to draw them downwardly upon exertion of sufficient force upon the primary pull rod, the inner ends of the primary and supplemental pull rods lying within the kettle and their outer ends projecting through the kettle, a support for the kettle, separable therefrom, an operating member carried by the support, and a separable connection between said operating member and primary pull rod serving to hold the kettle upon its support as well as to connect the operating member with the several tuning pins.

15. In a tympano, the combination of a kettle, vibratile head, the pressure ring engaging said head to vary the tension thereof, a plurality of brackets carried by the kettle, a plurality of non-rotative threaded tuning pins projected upwardly through said brackets and pressure ring and limited in their upward movement by said brackets, nuts threaded upon said tuning pins and engaging the pressure rings and a single actuating member connected with said several tuning pins and adapted to draw the same downwardly through their brackets to increase the tension upon the vibratile head.

16. In a tympano, the combination of a kettle, vibratile head, the pressure ring engaging said head to vary the tension thereof, a plurality of brackets carried by the kettle, a plurality of non-rotative threaded tuning pins projected upwardly through said brackets and pressure ring and limited in their upward movement by said brackets, nuts threaded upon said tuning pins and engaging the pressure rings, a plurality of pull rods having a longitudinal adjustable connection with the tuning pins and projected inwardly into the kettle, a primary pull rod connected to the inner ends of said plurality of pull rods and projected outwardly through the kettle.

17. In a tympano, the combination of a kettle, vibratile head, the pressure ring engaging said head to vary the tension thereof, a plurality of brackets carried by the kettle, a plurality of non-rotative threaded tuning pins projected upwardly through said brackets and pressure ring and limited in their upward movement by said brackets, nuts threaded upon said tuning pins and engaging the pressure rings, a plurality of pull rods having a longitudinal adjustable connection with the tuning pins and projected inwardly into the kettle, a primary pull rod connected to the inner ends of said plurality of pull rods and projected outwardly through the kettle, a support for the kettle, an operating lever mounted upon said support, and a separable connection between said primary pull rod and the operating lever.

18. In a tympano, the combination of a kettle, vibratile head, the pressure ring engaging said head to vary the tension thereof, a plurality of brackets carried by the kettle, a plurality of non-rotative threaded tuning pins projected upwardly through said brackets and pressure ring and limited in their upward movement by said brackets, nuts threaded upon said tuning pins and engaging the pressure rings, a plurality of bell cranks pivoted upon the kettle, one adjacent each bracket and connected with the adjacent tuning pin, a plurality of pull rods each having a longitudinally adjustable connection with the bell crank and projected inwardly into the kettle, a pull head connecting the inner ends of the several pull rods while permitting independent rotation thereof, a primary pull rod rotatably connected with the pull head and projected outwardly through the bottom of the kettle.

19. In a tympano, the combination of a kettle, vibratile head, the pressure ring engaging said head to vary the tension thereof, a plurality of brackets carried by the kettle, a plurality of non-rotative threaded tuning pins projected upwardly through said brackets and pressure ring and limited in their upward movement by said brackets, nuts threaded upon said tuning pins and engaging the pressure rings, a plurality of bell cranks pivoted upon the kettle one adjacent each bracket and connected with the adjacent tuning pin, a plurality of pull rods each having a longitudinally adjustable connection with the bell crank and projected inwardly into the kettle, a pull head connecting the inner ends of the several pull rods while permitting independent rotation thereof, a primary pull rod rotatably connected with the pull head and projected outwardly through the bottom of the kettle, a pedestal, an operating lever on the pedestal, and a separable connection between said lever and primary pull rod.

20. In a tympano, the combination of the kettle provided with a vibratile head, a plurality of circumferentially-spaced bell cranks pivoted on the kettle, a plurality of tuning members associating each bell crank with the head, a plurality of tension rods connected one to each bell crank and projecting inwardly into the kettle, a pull rod connected to the inner ends of said tension rods and depending therefrom, a support for the kettle, an operating member carried by the support and separably associated with the pull rod, and means for positively limiting the swing of the bell cranks under the tension of the head, independent of the operating member, whereby an initial tuning may be attained and maintained, independent of the operating member.

21. In a tympano, the combination of the kettle provided with a vibratile head, a plurality of individually-adjustable circumferentially-spaced tuning units, each forming a connection between the kettle and head by which the head may be tensioned upon the kettle and each comprising a bell crank and a tuning pin, a plurality of rods connected one to each tuning unit and projecting inwardly into the kettle, a primary rod connected to all of the tuning-unit rods and projected out of the kettle, and means for positively limiting the swing of the bell cranks under the tension of the head.

22. In a tympano, the combination of the kettle provided with a vibratile head, a plurality of individually-adjustable circumferentially-spaced tuning units, each forming a connection between the kettle and head by which the head may be tensioned upon the kettle and each comprising a bell crank and a tuning pin, a plurality of rods connected one to each tuning unit and projecting inwardly into the kettle, a primary rod connected to all of the tuning unit rods and projected out of the kettle, means for positively limiting the swing of the bell cranks under the tension of the head, a pedestal for the kettle, a foot lever on said pedestal, and a separable connection between the foot lever and primary rod.

23. In a tympano, the combination of the kettle provided with a vibratile head, a plurality of circumferentially-spaced tuning pins associated with said head by a laterally flexible connection, a plurality of circumferentially-spaced bell crank levers fulcrumed upon the exterior of the kettle and each operatively connected to a tuning pin, and tension means extending through the wall of the kettle by which said levers may be simultaneously swung.

24. In a tympano, the combination of the kettle provided with a vibratile head, a plurality of circumferentially-spaced tuning pins associated with said head by a laterally flexible connection, a plurality of circumferentially-spaced bell crank levers fulcrumed upon the exterior of the kettle and each operatively connected to a tuning pin to produce longitudinal movement thereof, and tension means extending through the wall of the kettle by which said levers may be simultaneously swung.

25. In a tympano, the combination of the kettle provided with a vibratile head, a plurality of circumferentially-spaced tuning pins associated with said head by a laterally flexible connection, a plurality of circumferentially-spaced bell crank levers fulcrumed upon the exterior of the kettle and each operatively connected to a tuning pin to produce longitudinal movement thereof, a plurality of actuators connected one to each lever and extending through the wall of the kettle, and a primary actuator connected to all of said actuators.

26. In a tympano, the combination of the kettle provided with a vibratile head, a plurality of circumferentially-spaced tuning pins associated with said head by a laterally flexible connection, a plurality of circumferentially-spaced bell crank levers fulcrumed upon the exterior of the kettle and each operatively connected to a tuning pin, a plurality of actuators connected one to each lever and extending through the wall of the kettle, and a primary actuator connected to all of said actuators.

27. In a tympano, the combination of the kettle provided with a vibratile head, a plurality of circumferentially-spaced tuning pins associated with said head by a laterally flexible connection, a plurality of circumferentially-spaced levers fulcrumed upon the kettle and each operatively connected to a tuning pin, a plurality of actuators connected one to each lever, and projected into the interior of the kettle, and a primary actuator connected to all of said actuators within the kettle.

28. In a tympano, the combination of a kettle provided with a vibratile head, a pressure ring engaging the periphery of said head, a plurality of circumferentially-spaced tuning pins carried by said ring and each so supported as to permit lateral swing, a plurality of circumferentially-spaced bell crank levers fulcrumed on the kettle and each connected to a tuning pin, and tension means extending through the wall of the kettle by which said levers may be simultaneously swung.

29. In a tympano, the combination of a kettle provided with a vibratile head, a pressure ring engaging the periphery of said head, a plurality of circumferentially-spaced tuning pins carried by said ring and each so supported as to permit lateral swing, a plurality of circumferentially-spaced levers fulcrumed on the kettle and each connected to a tuning pin, a cross-bar pivoted to one arm of each lever, a pull rod engaging each cross-bar and projected into the interior of the kettle, and a primary pull rod connected to the inner ends of the series of pull rods.

30. In a tympano, the combination of a kettle with its vibratile head, and tuning means by which the pitch of said head may be varied, said tuning means comprising a foot lever, retaining means for retaining said lever in any desired position of adjustment; a foot piece for operating the foot lever, connections between the foot piece and retaining means, and a movable mounting for the foot piece on the foot lever which permits the operation of said connections to project and retract the retaining means independently of the force applied to said foot piece in manipulating the foot lever.

In witness whereof, I have hereunto set my hand at Indianapolis, Indiana, this 20th day of January, 1925.

CECIL H. STRUPE.